United States Patent
Laurent et al.

[11] 3,862,918
[45] Jan. 28, 1975

[54] MOULDABLE COMPOSITIONS FOR ARTICLES WHICH ARE RESISTANT TO SHOCK AND TO WEAR AT HIGH TEMPERATURE

[75] Inventors: Serge Laurent, Bron; Maurice Mallet, Lyon, both of France

[73] Assignee: Rhone-Poulenc S.A., Paris, France

[22] Filed: Sept. 11, 1973

[21] Appl. No.: 396,147

[30] Foreign Application Priority Data
May 26, 1971 France .............. 71.19102
Aug. 2, 1971 France .............. 71.28245

[52] U.S. Cl. 260/37 N, 260/857 TW, 260/857 PA, 260/857 UN
[51] Int. Cl. .......................... C08g 51/10
[58] Field of Search ......... 260/37 N, 78 TF, 47 CZ, 260/857 TW, 857 UN

[56] References Cited
UNITED STATES PATENTS

| | | | |
|---|---|---|---|
| 3,356,760 | 12/1967 | Matray | 260/857 |
| 3,494,890 | 2/1970 | Marello | 260/47 |
| 3,652,510 | 4/1972 | Blomberg | 260/78 A |
| 3,658,764 | 4/1972 | Bargan | 260/78 UA |

*Primary Examiner*—Morris Lieman
*Assistant Examiner*—Paul R. Michl
*Attorney, Agent, or Firm*—Stevens, Davis, Miller & Mosher

[57] ABSTRACT

Mouldable compositions which give rise, on moulding, to articles having good resistance to shock and to wear at high temperatures are provided comprising, by weight, a. about 10 to 70% of a prepolymer binder obtained from a bis-imide of an unsaturated dicarboxylic acid of the general formula:

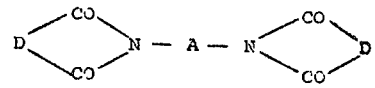

in which D represents a divalent organic radical containing a carbon-carbon double bond and A represents a divalent organic radical possessing two to 30 carbon atoms, and from a polyamine of the formula:

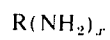

in which $x$ is an integer of at least 2 and R represents an organic radical of valency $x$, about 0.55 to 25 mols of bis-imide being used per molar $-NH_2$ group supplied by the polyamine;

b. about 5 to 30% of polytrimellamide-imide fibres and/or aromatic polyamide fibres; and c. about 20 to 70% of fillers selected from particles of graphite, molybdenum disulphide, lead, bronze or fluorinated polymers and asbestos fibres.

7 Claims, No Drawings

MOULDABLE COMPOSITIONS FOR ARTICLES WHICH ARE RESISTANT TO SHOCK AND TO WEAR AT HIGH TEMPERATURE

This is a continuation of application Ser. No. 255,252, filed May 22, 1972, now abandoned.

The present invention relates to compositions which can be used for the manufacture, by moulding, of articles which are stable at high temperature and which possess a good resistance to impact and to wear.

The present invention provides a composition which comprises, by weight:

a. 10 to 70% of a prepolymer binder obtained from a N,N'-bis-imide of an unsaturated dicarboxylic acid of the general formula:

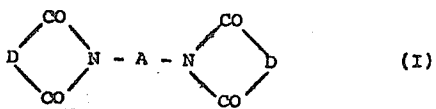
(I)

in which D represents a divalent organic radical containing a carbon-carbon double bond and A represents a divalent organic radical possessing two to 30 carbon atoms, and from a polyamine of the general formula $$R(NH_2)_x$$
(II)

in which $x$ is an integer at least equal to 2 and R represents an organic radical of valency $x$, from 0.55 to 25 mols of bis-imide being used per molar $NH_2$ group supplied by the polyamine;

b. 5 to 30% of polytrimellamide-imide fibres and/or of aromatic polyamide fibres;

c. 20 to 70% of fillers which are particles of graphite, molybdenum disulphide, lead, bronze or fluorinated polymers and/or asbestos fibres.

In formula (I) the symbol D is derived from an anhydride of an ethylenically unsaturated dicarboxylic acid of formula:

(III)

such as maleic anhydride, citraconic anhydride, itaconic anhydride, pyrocinchonic anhydride or dichloromaleic anhydride as well as the Diels-Alder products of one of these anhydrides with an acyclic, alicyclic or heterocyclic diene. As regards the latter, reference may be made to, for example, volume IV of "Organic Reactions" (John Wiley and Sons, Inc.); tetrahydrophthalic anhydride and endomethylene-tetrahydrophthalic anhydride are particular examples.

The symbol A can, for example, represent a straight or branched alkylene radical with less than 13 carbon atoms, a phenylene radical, a cyclohexylene radical or a radical of formula:

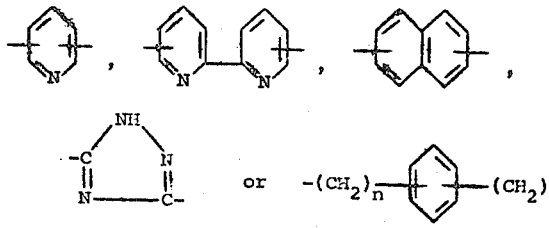

where $n$ represents an integer from 1 to 3. The symbol A can also comprise several phenylene or cyclohexylene radicals, optionally substituted by methyl groups, bonded to one another by a simple valency bond or by an inert atom or group such as $-O-$, $-S-$, an alkylene group with one to three carbon atoms, $-CO-$, $-SO_2-$, $-NR_1-$, $-N=N-$, $-CONH-$, $-COO-$, $-P(O)R_1-$, $-CONH-X-NHCO-$,

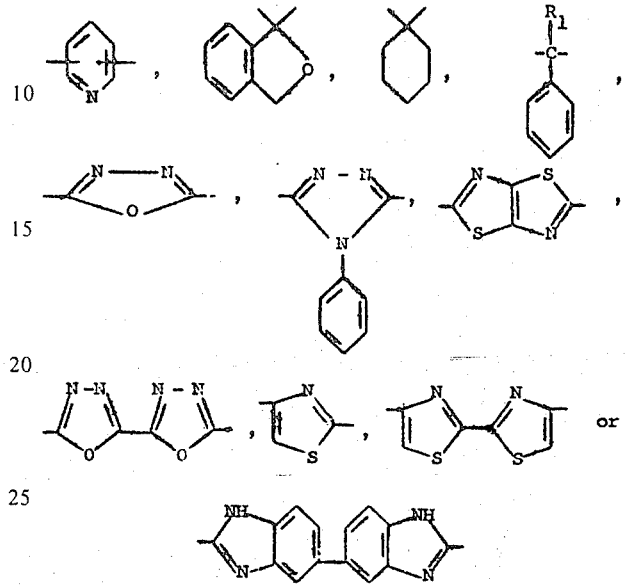

where $R_1$ represents a hydrogen atom, an alkyl radical with one to four carbon atoms, a phenyl radical or a cyclohexyl radical, and $x$ represents an alkylene radical with less than 13 carbon atoms.

Specific examples of bis-imides of formula (I) include N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylmethane-bis-maleimide, N,N'-4,4'-diphenyl ether-bis-maleimide N,N'-4,4'-diphenylsulphone-bis-maleimide, N,N-4,4'-dicyclohexylmethane-bis-maleimide, N,N'-4,4'-(3,5-diphenyl)-pyridine-bis-maleimide; N,N'-pyridine-2,6-diyl-bis-maleimide, N,N-'-α,α'-4,4'-dimethylene-cyclohexane-bis-maleimide, N,N'-meta-xylylene-bis-maleimide, N,N'-para-xylylene-bis-maleimide, N,N'-4,4'-diphenylcyclohexane-bis-maleimide, N,N'-meta-phenylene-bis-tetrahydrophthalimide, N,N'-4,4'-diphenylmethane-bis-citraconimide, N,N'-4,4'-(1,1-diphenyl)-propane-bis-maleimide, N,N'-4,4'-(1,1,1-triphenyl)-ethane-bis-maleimide, N,N'-4,4'-triphenylmethane-bis-maleimide, N,N'-3,5-(1,2,4-triazole)-bis-maleimide and N,N'-3,5-(1,2,4-triazole)-bis-maleimide. These bis-imides can be prepared by applying the methods described in, for example, U.S. Pat. No. 3,018,290 and British Specification No. 1,137,592.

The polyamine of formula (II) can be a diprimary diamine of formula:

$$H_2N-E-NH_2$$
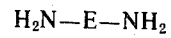
(IV)

in which E represents one of the radicals which the radical A represents. Typical examples of diprimary diamines include: 4,4'-diamino-dicyclohexylmethane, 1,4-diamino-cyclohexane, 2,6-diamino-pyridine, meta-phenylene-diamine, para-phenylene-diamine, 4,4'-diamino-diphenylmethane, 2,2-bis-(4-aminophenyl)-propane, benzidine, 4,4'-diamino-phenyl ether, 4,4'-diamino-phenyl sulphide, 4,4'-diamino-diphenylsulphone, bis-(4-amino-phenyl)-methylphosphine oxide, bis-(4-amino-phenyl)-phenylphosphine oxide, N,N'-bis-(4-amino-phenyl)-methylamine, 1,5-diamino-naphthalene, meta-xylylene-diamine, para-xylylene-diamine, 1,1-bis-(para-aminophenyl)-phthalane, hexamethylene-diamine, 6,6'-diamino-2,2'-dipyridyl, 4,4'-diamino-benzophenone, 4,4'-diamino-azobenzene, bis-(4-amino-phenyl)-phenylmethane, 1,1-bis-(4-amino-phenyl)-cyclohexane, 1,1-bis-(4-amino-3-methyl-phenyl-cyclohexane, 2,5-bis-(meta-aminophenyl)-1,3,4-oxadiazole, 2,5-bis(para-aminophenyl)-1,3,4-oxadiazole, 2,5-bis-(meta-aminophenyl)-(4,5-d)-thiazolo-thiazole, 5,5'-di(meta-aminophenyl)-(2,2')-bis-(1,3,4-oxadiazolyl), 4,4'-bis-(para-aminophenyl)-2,2'-dithiazole, meta-bis-[(4-para-aminophenyl)-2-thiazolyl]-benzene, 2,2'-bis -(m-aminophenyl)-5,5'-dibenzimidazole, 4,4'-diaminobenzanilide, 4-amino-phenyl-4'-amino-benzoate, N,N'-bis-(4-amino-benzoyl)-p-phenylene-diamine, 3,5-bis-(m-aminophenyl)-4-phenyl-1,2,4triazole, N,N'-bis-(p-amino-benzoyl)-4,4'-diamino-diphenylmethane, p-bis-(4-aminophenoxycarbonyl)-benzene, p-bis-(4-amino-phenoxy)-benzene, 3,5-diamino-1,2,4-triazole, 1,1-bis-(4-aminophenyl)-1-ethane and 3,5-bis-(4-aminophenyl)-pyridine.

Polyamines of formula (II) which may be used, other than the diprimary diamines, are preferably those which have less than 50 carbon atoms and which possess three to five —$NH_2$ groups per molecule. The —$NH_2$ groups can be carried by a benzene ring which may optionally be substituted by methyl groups, a naphthalene ring, a pyridine ring or a triazine ring; they can also be carried by several benzene rings bonded to one another by a simple valency bond or by an inert atom or group which can be one of those described above within the definition of A, or

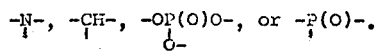

Examples of such polyamines include: 1,2,4-triamino-benzene, 1,3,5-triamino-benzene, 2,4,6-triamino-toluene, 2,4,6-triamino-1,3,5-trimethyl-benzene, 1,3,7-triamino-naphthalene, 2,4,4'-triamino-diphenyl, 2,4,6-triamino-pyridine, 2,4,4'-triamino-phenyl ether, 2,4,4'-triamino-diphenylmethane, 2,4,4'-triamino-diphenylsulphone, 2,4,4'-triamino-benzophenone, 2,4,4'-triamino-3-methyl-diphenyl-methane, N,N,N-tri-(4-amino-phenyl)-amine, tri-(4-amino-phenyl)-methane, 4,4',4''-triamino-phenyl orthophosphate, tri-(4-amino-phenyl)-phosphine oxide, 3,5,4'-triamino-benzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraamino-phenyl ether, 3,3'-4,4'-tetraamino-diphenylmethane, 3,3'-4,4'-tetraaminodiphenylsulphone, bis-3,5-(3,4'-diaminophenyl)pyridine and the oligomers of the average formula:

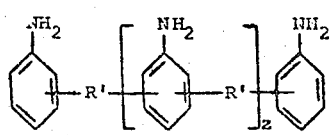

in which z represents a number ranging from about 0.1 to 2 and R' represents a divalent hydrocarbon radical with one to eight carbon atoms which is derived from an aldehyde or ketone of formula:

$$O=R'$$ (VI)

in which the oxygen atoms is bonded to a carbon atom of the radical R'; typical such aldehydes and ketones are formaldehyde acetaldehyde, benzaldehyde, oenanthaldehyde, acetone, methyl ethyl ketone, 2-hexanone, cyclohexanone and acetophenone. Oligomers possessing amino groups can be obtained according to known processes such as those described in French Pat. Nos. 1,430,977, 1,481,935 and 1,533,595, the crude mixtures of oligomers obtained in accordance with these processes can be enriched in one or more of their constituents, for example by distillation under reduced pressure.

The prepolymer used in the compositions of this invention can be prepared by heating the bis-imide and the polyamine, which may optically have been intimately mixed together, suitably at between 50° and 250° C.

Preferred prepolymers include those which have a softening point between 50° and 200° C; they can be produced by heating the bis-imide and the polyamine in bulk, until a homogeneous liquid or pasty mixture is obtained. The temperature can vary as a function of the melting point of the starting reagents but, as a general rule, it is between 80° and 180° C; it is advantageous to carry out a prior homogenisation of the mixture. The preparation of the prepolymers can also be carried out by heating the reagents in a polar solvent such as dimethylformamide, N-methylpyrrolidone, dimethylacetamide, N-methylcaprolactam, diethylformamide or N-acetylpyrrolidone, suitably at a temperature of between 50° and 180° C.

Usually, the preparation of the prepolymers involves only the bis-imide and the polyamine. However, it is also possible to carry out the reaction in the presence of a strong acid, i.e., an acid, in the Brönsted sense, which may be a mono- or poly-acid at least one of the groups possessing a pKa ionisation constant of less than 4.5. They can be inorganic acids such as hydrochloric acid, sulphuric acid, nitric acid or phosphoric acid which may optionally be substituted by an organic radical, such as sulphonic acids and phosphonic acids. They can also be carboxylic acids which can have a simple structure or possess substituents which do not interfere with the reaction between the bis-imide (I) and the polyamine (II). The acid which is preferred is maleic acid. The acid is usually employed in an amount from 0.5 to 5% by weight, based on the weight of the bis-imide.

The aromatic polyamides which produce fibres which can be used in the compositions of this invention, possess a melting point above 300° C. and an inherent viscosity of at least 0.6. They comprise recurring units of the formula:

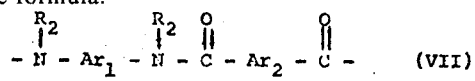 (VII)

in which each of the symbols $R_2$, which may be identical or different, represents a hydrogen atom or an alkyl radical with 1 to 4 carbon atoms, and each of $Ar_1$ and $Ar_2$, which may be identical or different, represents a divalent aromatic radical. By way of illustration, $Ar_1$ and $Ar_2$ may be the radicals of the formulae:

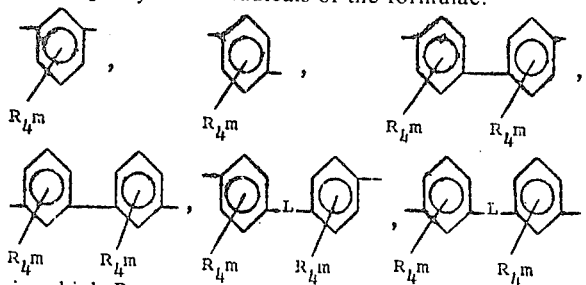

in which $R_4$ represents a hydrogen atom, an alkyl or alkoxy radical containing one to four carbon atoms, or a halogen atom, $m$ is 0 or an integer from 1 to 4 and L is

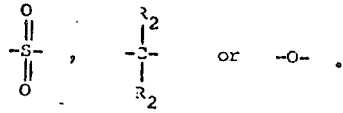

The polyamides of formula (VII) can be obtained by reacting an aromatic diacid halide of formula:

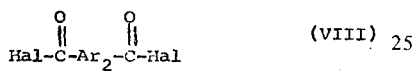

(VIII)

in which Hal represents a halogen atom which is chlorine, bromine, or fluorine, $Ar_2$ being as defined above, with a diamine of formula:

$$R_2NH-Ar_1-NHR_2$$

(IX)

$R_2$ and $Ar_1$ being as defined above.

The polymers of formula (VII) can also be obtained from mixtures of the diacid halides and/or mixtures of the diamines.

Typical diacid halides of formula (VIII) which may be used are the chlorides of iso- and terephthalic acids which are either unsubstituted or substituted by one or more lower alkyl radicals such as methyl, ethyl or propyl, one or more alkyloxy radicals such as methoxy or ethoxy or by one or more halogen atoms; these various substituents can be the same or different. Typical substituted phthalic acid chlorides which may be used include the chlorides of 2-methyl-4-ethyl-isophthalic acid, 2-methyl-4-ethyl-5-propyl-isophthalic acid, 2-methoxy-4-ethoxy-isophthalic acid, the chlorides of chloro-, bromo- and fluoro-isophthalic acids and the corresponding derivatives of terephthalic acid. Other examples of diacid halides of formula (VIII) include the chlorides, bromides and fluorides of bis(4-carboxyphenyl)oxide, bis(4-carboxyphenyl)sulphone, bis(3-carboxyphenyl)sulphone, 4,4'-dicarboxydiphenyl and of 3,3'-dicarboxydiphenyl as well as the derivatives of these acids which carry alkyl, alkyloxy or halogen substituents on the aromatic nucleus. Typical diamines of formula (IX) which may be used include the phenylenediamines, in particular para-phenylenediamine and meta-phenylenediamine. The derivatives of these diamines which have been substituted on the nitrogen atom and/or on the aromatic nucleus may also be used, the substituents, which may be the same or different, being, for example, alkyl radicals, such as methyl, ethyl or propyl, alkoxy radicals such as methoxy, ethoxy or butoxy or halogen atoms. Typical substituted phenylenediamines include N,N'-dimethyl-meta-phenylene-diamine, N,N'-diethyl-meta-phenylene-diamine, 2-methyl-4-ethyl-meta-phenylene-diamine, 2-methoxy-4-ethoxy-meta-phenylene-diamine and the chloro-, bromo- and fluoro-meta-phenylene-diamines. Other examples of diamines of the formula (IX) include 4,4'-diamino-diphenyl, 3,3'-diamino-diphenyl, bis-(4-amino-phenyl)ether, bis-(3-amino-phenyl)ether, bis-(4-amino-phenyl)sulphone and bis-(3-amino-phenyl)sulphone.

The aromatic polyamide fibres used in this invention, which can be prepared by dry or wet spinning, are suitably between 0.5 and 20 mm. and preferably between 1 and 10 mm. long, and of a gauge which is usually between 50 and 20,000 dtex and preferably between 400 and 4,000 dtex. These fibres usually consist of one or more yarns which, in themselves, contain a number of strands, usually between 6 and 1,000.

The polytrimellamide-imides which produce fibres which can be used in this invention generally contain (relative to the total number of polymer units): 30 to 100% of units of the formula:

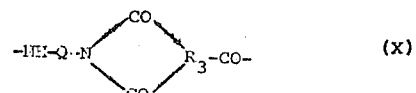

(X)

0 to 20% of units of the formula:

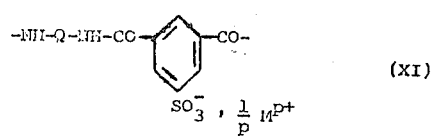

(XI)

and 0 to 50% of units of the formula:

$$-NH-Q-NH-CO-Z-CO-$$

(XII)

in which Q represents a divalent radical containing at least one benzene ring, $R_3$ represents a trivalent aromatic radical, Z represents a divalent, aromatic, aliphatic or cycloaliphatic radical, M represents an alkali metal or an alkaline-earth metal ion and $p$ is 1 or 2.

If the polymer contains units of formula (XI), these preferably represent 1 to 10% of the total number of units; if the polymer contains units of formula (XII), these preferably represent 5 to 25% of the total number of units.

Examples of radicals represented by Q, include m-phenylene, p-phenylene and p,p'-diphenylene radicals as well as radicals of the formula:

(XIII)

in which T represents, for example, $-O-$, $-CH_2-$, $-C(CH_3)_2-$, $-SO_2-$ or $-N=N-$.

Examples of radicals represented by $R_3$ include the trivalent radicals of the formulae:

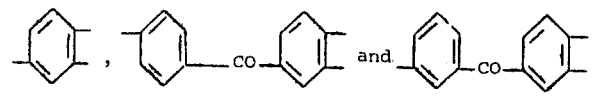

Examples of radicals represented by Z include arylene radicals such as those represented by Q, alkylene radicals containing two to 12 carbon atoms such as ethylene, trimethylene, tetramethylene, hexamethylene or octamethylene radicals and cycloalkylene radicals with five or six carbon atoms in the ring, such as cyclopentylene and cyclohexylene radicals.

The polymers containing only units of formula (X) can be obtained by reacting, in substantially stoichiometric amounts, in a polar organic solvent, an aromatic anhydride of the formula:

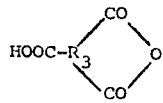

(XIV)

with a difunctional compound of the general formula:

Y—Q—Y (XV)

in which Y can represent a —NCO group or a group of the formula —NHCOG, where G represents an alkyl radical with one to six carbon atoms, a phenyl radical or a methylphenyl radical. Another process for obtaining these polymers consists of reacting in approximately stoichiometric amounts in a polar organic solvent, an anhydride of the formula:

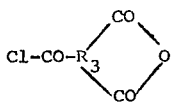

(XVI)

with a diprimary diamine of the general formula:

H₂N—Q—NH₂

(XVII)

R and Q being as defined above.

The aromatic anhydride of formula (XIV) is preferably trimellitic anhydride. Examples of diisocyanates of formula (XV) include monocyclic diisocyanates such as diisocyanato-toluene and dicyclic diisocyanates such as diisocyanato-diphenylmethane, diisocyanato-diphenylpropane or diisocyanato-diphenyl ether. Examples of diamines of the formula (XVII) include benzidine, diamino-diphenylmethane, diaminodiphenylpropane and diaminodiphenyl ether.

The polymers which simultaneously contain units of formula (X) and units of formula (XI) and/or (XII) can be obtained by the reaction of:

a. a diisocyanate of formula (XV)
b. an acid anhydride of formula (XIV)
c. a diacid of formula

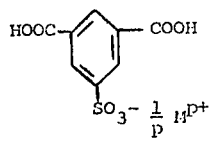

and/or one or more diacids of formula HOOC—Z—COOH (XVIII), the total proportion of acid and anhydride groups of constituents (b) and (c) substantially corresponding to the total number of NCO groups of the diisocyanate.

Suitable diacids of formula (XVIII) include, terephthalic acid, isophthalic acid, adipic acid, sebacic acid and succinic acid. The polymers which simultaneously contain units of formula (X) and units of formula (XI) and/or (XII) can also be obtained by the reaction of:

a'. a diamine of formula (XVII)
b'. an anhydride of formula (XVI)
c'. an acid dichloride of the formula

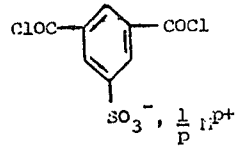

and/or one or more acid dichlorides of formula ClOC—Z—COCl.

The solvents which are generally used in the preparation of the polytrimellamide-imides described above are aprotic polar solvents, such as dimethylformamide, dimethylacetamide, hexamethylphosphotriamide, tetramethylene sulphone and N-methyl-pyrrolidone.

The fibres obtained from polymers containing units of formulae (X) and, optionally, (XII) can be produced by extruding a solution of the polymer through a spinneret held at a temperature of between 60° and 180°C., into an atmosphere which is close to, or higher, than the boiling point of the solvent, treating the yarns obtained at a temperature above 160° C. and stretching the yarns at a temperature higher than the temperature corresponding to the maximum absolute value of the first derivative of the function expressing the variation of maximum drawing tension with temperature.

The fibres obtained from polymers simultaneously containing units of formula (X) and (XI), and optionally (XII), can be produced by extruding a solution of the polymer in N-methylpyrrolidone into an aqueous coagulating bath containing 30 to 75% by weight of N-methylpyrrolidone, stretching the filaments produced in this way in air at least 1.5 times, washing and drying the filaments and optionally stretching them again.

The polytrimellamide-imide fibres which can be used in the compositions of the present invention are usually between 0.5 and 20 mm. and preferably between 1 and 10 mm. long, and of a gauge which is usually between 50 and 20,000 dtex and preferably between 400 and 4,000 dtex. These fibres usually consist of one or more yarns, which themselves contain a number of strands, usually between 6 and 200.

The particles and fibres which are used as fillers in the compositions are particles of graphite, molybdenum disulphide, lead, bronze, and fluorinated polymers and asbestos fibres. It is possible to make use of these fillers singly or as mixture. The average size of the particles is usually between 0.1 and 100μ, preferably between 0.5 and 50μ. The average length of the asbestos fibres is usually between 0.5 and 20 mm., and their diameter is between 10μ and 1 mm. The fluorinated polymers which can be used in the form of particles are usually polytetrafluoroethylene or the copolymers of tetrafluoroethylene and hexafluoropropylene.

The preferred proportions of the constituents of the compositions according to the invention are, by weight, 20 to 50% of prepolymer, 5 to 20% of polytrimellamide-imide fibres and/or aromatic polyamide fibres and 30 to 60% of the filler particles and/or asbestos fibres.

The compositions of this invention can be prepared in various ways. In particular, it is possible either to prepare the prepolymer separately and then to mix it with the various other ingredients, or to prepare the prepolymer in the presence of all or part of the other ingredients.

The compositions of this invention can be moulded under a pressure which is usually between 50 and 400 bars and at a temperature which is usually between 150° and 350°. These moulding conditions are generally maintained for, for example, between 30 minutes and 4 hours. It is advantageous to precede the actual moulding, as defined above, by a short period of heating, for example of between 10 minutes and 1 hour, at a temperature higher than the melting point of the prepolymer so as to ensure that the molten polymer impregnates the various fillers, in particular the fibres, well. It is also possible to follow the moulding by a reheating of the article, at atmospheric pressure, at a temperature which can be between 150° and 250°; this reheating usually lasts between 12 and 48 hours.

The moulded articles manufactured from the compositions according to the invention combine good stability towards heat with a high resistance to wear and to impact. Furthermore, these articles have a low coefficient of friction at high temperature. The resistance to impact (resilience) is a particularly advantageous property, both in machining them and in positioning them. In effect, it is known that the striking of such articles with tools which revolve at great speed such as milling cutters, grinding wheels and saws, causes a violent impact on the articles, which can cause serious damage. Likewise, positioning them by force, either hot or cold, under the action of a press or jacks creates large mechanical stresses which can also cause damage. These latter conditions exist if the articles are used, for example, as compressor segments or valve seats. It must, of course, be understood that these applications are given only by way of indication and that the invention is not limited to the production of such machined articles. In particular, the compositions of this invention can be used in the manufacture of other articles such as brake linings of clutch linings or transmission linings.

The following Examples further illustrate the present invention.

EXAMPLE 1

90.2 g. of N,N'-4,4'-bis-(diphenylmethane)-maleimide (I) are reacted with 19.6 g. of bis-(4-aminophenyl)-methane (II) (molar ratio I/II = 2.5). The reaction is carried out at 165° C. and lasts for 20 minutes. The resulting prepolymer is then powdered (average diameter of the particles: 50μ).

35 g. of this prepolymer, 5 g. of molybdenum disulphide (diameter of the particles: between 1 and 5μ), 50 g. of micronised graphite (diameter of the particles: between 1 and 11μ; carbon content = 98–99%) and 10 g. of aromatic polyamide fibres are mixed.

The aromatic polyamide fibres, which are sold commercially by Messrs. Du Pont de Nemours under the tradename NOMEX, originate from a polymer containing a plurality of units of the formula:

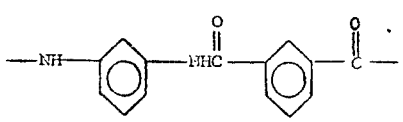

These fibres are of gauge 1330 dtex, and are made up of 600 strands. They have a modulus of 1,159 g/tex and a density of 1.38; their average length is 6 mm.

The mixture produced from the various ingredients listed above is placed in an oven and heated to 175° for 20 minutes. A part of the powder is placed in a cylindrical mould of diameter 200 mm, previously heated to 250° C., and it is held at this temperature for 1 hour under a pressure of 200 bars. A disc ($D_1$) obtained after removal from the mould is 12.7 mm. thick. Another part of the powder is moulded into a second disc ($D_2$), 6 mm. thick and 80 mm. in diameter, under the conditions described above.

The two discs $D_1$ and $D_2$ are then stoved for 24 hours at 200°. The disc $D_1$ is then tested for its impact resistance and the disc $D_2$ is tested for its resistance to wear.

Impact Resistance

This is determined according to the Standard Specification ASTN D 256-56 (Method A Test Type IZOD). It is expressed in Newton-metre per metre (N.m/m).

The resilience of the sample cut out of disc $D_1$ is 56.7 N.m/m.

Resistance to Wear

An apparatus is used similar to that described in Example 10 of Belgian Patent No. 744,247, but in which the friction track has a diameter of 40 mm. (instead of 120 mm.). The test conditions are as follows: speed at which the track moves = 1 m/second; contact pressure = 3 bars.

The loss in weight of the sample is measured, from which the radial wear can be determined, taking account of the density (1.7) and the volume (2 cm³) of the sample. A radial wear of 0.0425 mm. is observed in an experiment lasting 226 hours, which, by extrapolation, gives a radial wear of 0.19 mm/1,000 hours in the experiment.

EXAMPLE 2

The prepolymer of Example 1 is used in the form of a powder (average diameter of the particles = 50 μ).

A composition containing 35 g. of the prepolymer, 5 g. of molybdenum disulphide (diameter of the particles: between 1 and 5 μ), 50 g. of micronised graphite (diameter of the particles between 1 and 11 μ; carbon content = 98–99%) and 10 g. of polytrimellamide-imide fibres is prepared.

The polytrimellamide-imido was prepared by reacting 100 mols of bis-(4-isocyanato-phenyl)-methane, 80 mols of trimellitic anhydride and 20 mols of terephthalic acid. The inherent viscosity of the polymer is 1.01 (measured as a solution containing 5 g/l in N-methylpyrrolidone [NMP]).

The fibres are prepared in the following manner: A 23.1% solution in NMP is extruded at a temperature of 110° C. through a spinneret which possesses 60 holes of 0.10 mm. diameter, downwards into a vertical spinning cell, 7 m. long and 200 mm. in diameter, the walls of which are held at 245°. A current of hot air passes through the cell from above, the air/solvent mixture being drawn off at the lower part of the cell. A yarn of 650 dtex/60 strands is obtained at a speed of 150 m/minute. 8 identical yarns are assembled and the whole is twisted, with a Z twist, at the rate of 20 turns/metre on a metal support. This yarn is then stretched 3.3 times in air at 340° C., by passing it through an electrically heated tube 1 m. long and 8 mm. in diameter, from which it issues at a speed of 24 m/minute. It has the following characteristics:

Gauge: 1303 dtex/480 strands

Dry tenacity: 45 g/dtex

Elongation when dry: 18.6%. This yarn is cut into fibres of average length 6 mm, which are then used in the composition.

The composition described above is placed in a mould of dimensions 125 × 12 × 5 mm, which has previously been heated to 250° C. for 1 hour.

The bar produced in this way is tested for its resistance to wear and its impact resistance.

Resistance to Wear

Using the apparatus described in Example 10 of Belgian Pat. No. 744,247, equipped with a friction track and operating under the experimental conditions of Example 1, a radial wear of 0.0715 mm. is observed for an experiment lasting 238 hours, which, by extrapolation, gives a radial wear of 0.3 mm/1,000 hours duration of the experiment.

Impact Resistance

The resistance to shock, determined in accordance with Standard Specification ASTM D 256–56 (Method A Test Type IZOD) is 125 N.m/m.

EXAMPLE 3

The experiment of the procedure Example is repeated, with the same constituents in the same amounts.

The experimental procedure is as follows:

10 g. of trimellamide-imide fibres are mixed with 15 g. of the prepolymer and the whole is placed in an oven at 165° C. for 20 minutes. During this period, the prepolymer melted and impregnated the fibres. Another mixture containing the remaining 20 g. of prepolymer, the 5 g. of molybdenum sulphide and the 50 g. of graphite is then incorporated into this mixture; this second mixture was prepared at ambient temperature.

The composition produced in this way is then moulded under the conditions described in the proceeding Example.

The same tests when carried out as described previously, give the following results:

Wear 0.25 mm/1,000 hours

Resilience 145 N.m/m.

We claim:

1. A prepolymer moulding composition which comprises, by weight:
   a. about 10 to 70% of a prepolymer binder obtained from a bis-imide of an unsaturated dicarboxylic acid of the general formula:

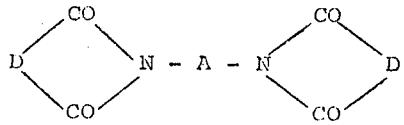

in which D represents a divalent organic radical containing a carbon-carbon double bond and A represents a divalent organic radical possessing two to 30 carbon atoms, and from a polyamine of the formula:

$$R(NH_2)_x$$

in which $x$ is an integer of at least 2 and R represents an organic radical of valency $x$, about 0.55 to 25 mols of bis-imide being used per molar $NH_2$ group supplied by the polyamine;
   b. about 5 to 30% of polytrimellamide-imide fibres, the fibres being between 1 and 10 mm long; and
   c. about 20 to 70% of fillers selected from particles of graphite, molybdenum disulphide, lead, bronze or fluorinated polymers and asbestos fibres.

2. A composition according to claim 1, in which the polytrimellamide-imide fibres consist of about 30 to 100% of units of the formula:

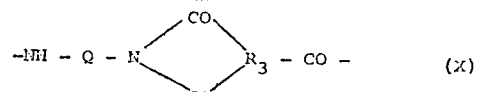

0 to 20% of units of the formula:

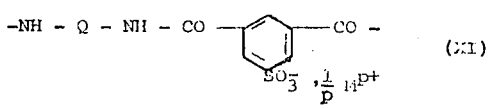

and 0 to 50% of units of the formula:

$$-NH - Q - NH - CO - Z - CO -$$

(XII)

based on the total number of units in the polymer, in which Q represents a divalent radical containing at least one benzene ring, $R_3$ represents a trivalent aromatic radical, Z represents a divalent, aromatic, aliphatic or cycloaliphatic radical, M represents an alkali metal or an alkaline-earth metal ion and $p$ is 1 or 2.

3. A composition according to claim 2, in which the polytrimellamide-imide fibres contain 1 to 10% of units of formula (XI) or 5 to 25% of units of formula (XII), or both, the remainder being units of formula (X).

4. A composition according to claim 1, in which A or R or both represents a diphenylenemethane radical.

5. A composition according to claim 1, in which D is derived from maleic anhydride.

6. A composition according to claim 1, which comprises, by weight: about 20 to 50% of the prepolymer, about 5 to 20% of polytrimellamide-imide fibres, and about 30 to 60% of the filler.

7. A composition according to claim 1, in which the polytrimellamide-imide fibres have a gauge of between 50 and 20,000 dtex.

* * * * *